W. RADUECHEL.
DRAFT EQUALIZER.
APPLICATION FILED AUG. 4, 1914.
1,144,915.
Patented June 29, 1915.
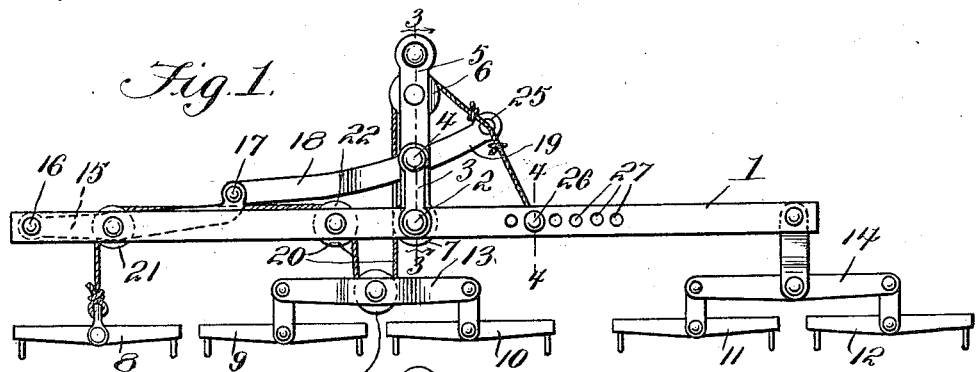
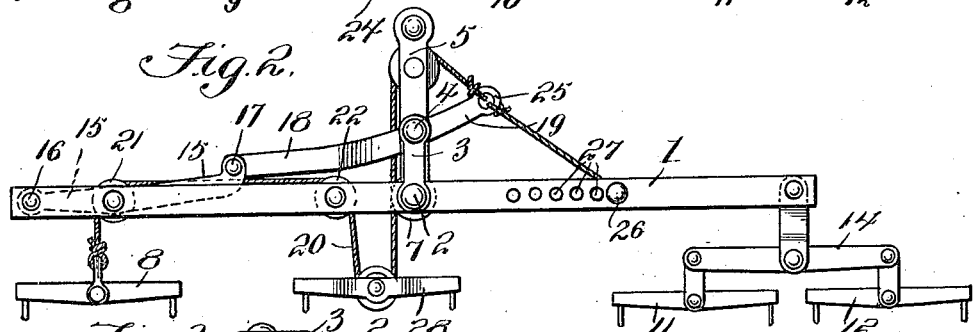
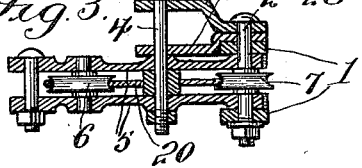
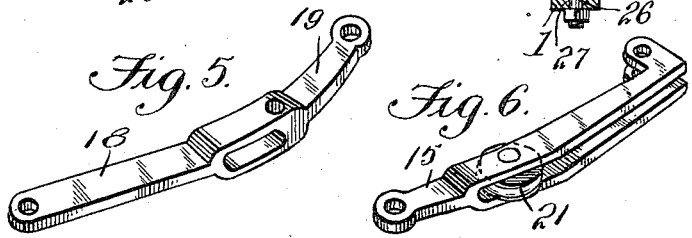
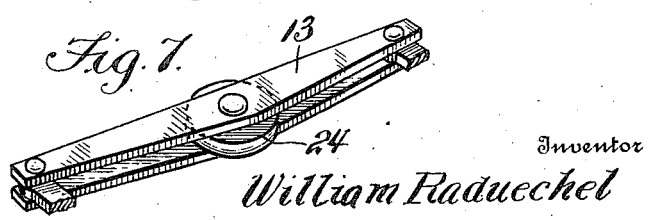
Inventor
William Raduechel
By Victor J. Evans
Attorney
Witnesses
J. T. L. Wright
P. M. Smith
THE NORRIS PETERS CO., PHOTO-LITHO., WASHINGTON, D. C.

UNITED STATES PATENT OFFICE.

WILLIAM RADUECHEL, OF BLOOMFIELD, NEBRASKA.

DRAFT-EQUALIZER.

1,144,915.   Specification of Letters Patent.   Patented June 29, 1915.

Application filed August 4, 1914. Serial No. 855,007.

*To all whom it may concern:*

Be it known that I, WILLIAM RADUECHEL, a citizen of the United States, residing at Bloomfield, in the county of Knox and State of Nebraska, have invented new and useful Improvements in Draft-Equalizers, of which the following is a specification.

This invention relates to draft equalizers, the object in view being to provide a draft equalizer or evener especially useful in connection with gang plows and the like, the principle of the invention being adapted to any number of draft animals and embodying an adjustable feature by which the draft may be equalized in accordance with the strength or condition of any particular animal so that each of the animals will be compelled to bear his share of the load.

With the above and other objects in view, the invention consists in the novel construction, combination and arrangement of parts, as herein described, illustrated and claimed.

In the accompanying drawings: Figure 1 is a plan view of a five-horse equalizer embodying the present invention. Fig. 2 is a similar view of a four-horse equalizer. Fig. 3 is a vertical cross section on the line 3—3 of Fig. 1. Fig. 4 is a vertical cross section on the line 4—4 of Fig. 1. Fig. 5 is a detail perspective view of the equalizing lever. Fig. 6 is a similar view of the equalizing arm. Fig. 7 is a similar view of the middle double tree.

Referring to the drawings 1 designates the main equalizer bar which in practice ordinarily and normally extends transversely of the path of movement of the machine and draft animals.

In carrying out the present invention the equalizing bar 1 is pivotally mounted at an approximately central point 2 on the forward extremity of a draft bar 3 said bar being pivotally connected at 4 to the vehicle or farming implement in rear thereof and the said draft bar being provided with an extension arm 5 embodying upper and lower members between which is journaled a pulley 6 the purpose of which will hereinafter appear. Another pulley 7 is journaled between the upper and lower parallel sections or members of the equalizer bar 1 and serves as a guide for the flexible equalizing cable hereinafter particularly described.

Swingle trees 8, 9, 10, 11 and 12 are connected with the equalizing bar 1 by the means to be described, the swingle trees 9 and 10 being connected to a middle double tree 13 and the swingle trees 11 and 12 being connected to a double tree 14 attached to one end of the equalizing bar 1.

15 designates an equalizing arm which is pivotally connected at 16 to the equalizing bar 1 adjacent to one end thereof. The arm 15 is pivotally connected at its other extremity at 17 to the extremity of the adjacent arm of an equalizing lever 18. This lever is fulcrumed on the pivot 4 above referred to at a point intermediate the ends thereof, said lever embodying an extension arm 19 at the opposite side of its fulcrum the purpose of which will appear.

20 designates a flexible cable, chain, rope or the like, said cable being attached at one end to the swingle tree 8. The cable then passes around a guide pulley 21 between the upper and lower members of the equalizing bar 1, then around another guide pulley 22 bearing the same relation to the equalizing bar, then around a pulley 24 on the double tree 13 thence rearwardly around the pulley 6 above described, also passing across the face of the pulley 7. After passing around the pulley 6, the cable is attached at 25 to the lever arm 19 and then extends to the equalizing bar 1, being provided at its extremity with an eye adapted to receive a pin 26 which is insertible in any one of a longitudinal series of holes 27 in the upper and lower members of the equalizing bar 1, the point of attachment of the last named end of the cable to the equalizing bar providing for greater or less leverage according to the distance between the pivotal center of the equalizing bar and the hole 27 in which the pin 26 is inserted.

The above description applies to the five-horse evener illustrated in Fig. 1. In a four-horse evener, as illustrated in Fig. 2, a swingle tree 28 is substituted for the double tree 13 shown in Fig. 1, the construction in all other respects corresponding with that illustrated and described in connection with Fig. 1.

By means of the construction above described, the load on all of the draft animals may be equalized and each animal forced to bear his share of the load. It will be seen that when the swingle tree 8 is drawn forward it moves the free end of the arm 15 in a forward direction thereby moving the point of attachment 25 of the cable to the lever arm 19 in the opposite direction and drawing rearwardly on the pin 26 and that arm of the equalizing bar. Practically the same result takes place when the double tree 13 is drawn forwardly as said double tree pulls forward on the looped portion of the flexible cable thereby producing the same rearward pull on the pin 26 and at the same time pulling rearwardly on the swingle tree. The cable holding pin 26 is, of course, adjusted to the necessary hole 27 to give the proper leverage in accordance with the strength of the several draft animals.

What I claim is:—

A draft equalizer comprising an equalizing bar, whiffletrees attached thereto, a draft bar to which said equalizing bar is pivotally attached, a sheave journaled on said draft bar at a distance from the pivotal connection between said draft bar and equalizing bar, a flexible element passing over said sheave and attached at one end to the equalizing bar, a whiffletree attached to the other end of said flexible element, a double tree provided with a pulley around which a portion of said flexible element passes, an equalizing arm pivotally attached at one end to said equalizing bar, and an equalizing lever fulcrumed intermediate its ends on the draft bar and having one arm pivotally connected to said equalizing arm and the other arm attached to said flexible element.

In testimony whereof I affix my signature in presence of two witnesses.

WILLIAM RADUECHEL

Witnesses:
 HERMAN FRIEDRICHS,
 FRED WARDNECK.

Copies of this patent may be obtained for five cents each, by addressing the "Commissioner of Patents Washington, D. C."